(12) United States Patent
Guthrie et al.

(10) Patent No.: US 7,029,376 B1
(45) Date of Patent: Apr. 18, 2006

(54) PROCESS OF FABRICATING WRITE POLE IN MAGNETIC RECORDING HEAD USING RHODIUM CMP STOP LAYER

(75) Inventors: Hung-Chin Guthrie, Saratoga, CA (US); Ming Jiang, San Jose, CA (US); Jyh-Shuey Lo, San Jose, CA (US); Hong Zhang, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/225,907

(22) Filed: Sep. 14, 2005

Related U.S. Application Data

(63) Continuation-in-part of application No. 11/067,913, filed on Feb. 28, 2005.

(51) Int. Cl.
*G11B 5/127* (2006.01)

(52) U.S. Cl. .................. 451/41; 29/603.15; 29/603.16; 360/122

(58) Field of Classification Search ................. 451/41; 29/603.07, 603.13, 603.14, 603.15, 603.16; 216/22; 360/110, 122
See application file for complete search history.

(56) References Cited

U.S. PATENT DOCUMENTS

| | | | |
|---|---|---|---|
| 6,468,913 B1 | 10/2002 | Pasqualoni et al. | |
| 6,635,186 B1 | 10/2003 | Small et al. | |
| 6,733,685 B1 | 5/2004 | Beilin et al. | |
| 6,756,302 B1 | 6/2004 | Shan et al. | |
| 6,962,663 B1 * | 11/2005 | Horng et al. | 216/22 |
| 2001/0042734 A1 | 11/2001 | Bellin et al. | |
| 2004/0057163 A1 * | 3/2004 | Lin | 360/322 |
| 2004/0152309 A1 | 8/2004 | Carter et al. | |
| 2004/0175942 A1 | 9/2004 | Chang et al. | |
| 2005/0044699 A1 * | 3/2005 | Khera et al. | 29/603.12 |
| 2005/0066517 A1 * | 3/2005 | Bedell et al. | 29/603.13 |

* cited by examiner

*Primary Examiner*—Jacob K. Ackun, Jr.
(74) *Attorney, Agent, or Firm*—Silicon Valley Patent Group LLP

(57) ABSTRACT

In the formation of the top magnetic write pole in a thin film magnetic recording head, a CMP stop layer comprising rhodium is deposited over the $Al_2O_3$ layer that overlies the top magnetic pole. A mixture of silicon dioxide, ammonium persulfate and benzotriazole is employed as a slurry in the CMP process that removes the portion of the $Al_2O_3$ layer covering the top magnetic pole. This eliminates the need for an extra thick layer of $Al_2O_3$ to be first deposited over the top pole and then removed to expose the top pole. The magnetic layer that forms the top pole can be plated to the target thickness of the top pole. As a result, the thickness of the photoresist layer that is used to define the size and shape of the top pole can be decreased to a desirable thickness, facilitating the use of DUV radiation to expose the photoresist layer.

21 Claims, 8 Drawing Sheets

PROCESS OF FABRICATING WRITE POLE IN MAGNETIC RECORDING HEAD USING RHODIUM CMP STOP LAYER

CROSS REFERENCE TO RELATED APPLICATION

This application is a continuation-in-part of application Ser. No. 11/067,913, filed Feb. 28, 2005, which is incorporated herein by reference in its entirety.

FIELD OF THE INVENTION

This invention relates to thin film magnetic recording heads and in particular to a process of forming a magnetic write pole of a magnetic recording head.

BACKGROUND

Thin film magnetic recording heads are used to read data from and write data to magnetic data storage media, typically magnetic data storage disks. As the amount of data stored in magnetic data storage disks has increased, the dimensions of the components in magnetic heads have decreased. The data are stored as minute magnetic domains that are arranged in a spiral track on the disk. With data stored in this density, it is necessary to accurately fabricate a magnetic head with very small components.

As general background, FIG. 1 shows a side view of a slider 10 containing a magnetic head 104. Slider 10 is "flying" over a magnetic data storage disk 12, which is rotating rapidly (e.g., at 7200 rpm) in the direction indicated by the arrow. Slider 10 has a leading edge 102 and a trailing edge 104. As disk 12 rotates, a cushion of air supports slider 10 at a flying height H above disk 12. In order to read and write the densely packed data on disk 12, the flying height H must be very low (e.g., 10 nm) and the tiny components of magnetic head 104 must be fabricated with great precision.

The surface of slider 10 facing disk 12 is commonly referred to as the air-bearing surface (ABS). FIG. 2 is a plan view of a portion of the ABS of magnetic head 104, viewed from below. The portion of the ABS shown in FIG. 2 contains two poles, designated P1 and P2 that are used to write data to disk 12. Poles P1 and P2 can be used exclusively to write data to disk 12, and a separate structure can be used to read data from disk 12. Alternatively, poles P1 and P2 can be used to read data from and write data to disk 12. The arrow indicates the direction of disk 12 relative to head 104. As shown, bottom pole P1 is formed of two layers 214 and 216 and is separated from top pole P2 by a non magnetic gap layer 226. Poles P1 and P2 are formed of a magnetic metal or alloy such as NiFe, CoFe or CoNiFe. Gap layer 226 is formed of a nonmagnetic material, typically alumina ($Al_2O_3$).

The smaller dimension of top pole P2 is referred to as the critical dimension (CD). The CD corresponds roughly to the width of a data track of disk 12. A magnetic flux extends outward from the ABS of magnetic head 104 into disk 12, and this flux is used to write data to disk 12. The CD of bottom pole P1 determines the width of this magnetic flux. At very high recording densities, it is important that the CD of top pole P2 be formed very accurately and the sides of top pole P2 be highly planar and parallel.

As those skilled in the art will understand, magnetic head 104 is fabricated by depositing a succession of layers on a wafer or substrate. The layers are deposited one on top of another in the direction from left to right in FIG. 2. A large number of magnetic heads are formed on a single wafer and are separated from each other after the fabrication process has been completed.

FIG. 3 is a cross-sectional view of magnetic head 104 taken through top pole P2 at the section designated 3—3 in FIG. 2. Note that, in FIG. 3, magnetic head 104 has been rotated 90° as compared with FIG. 1, so that the ABS faces the right side of the drawing.

The write structure of magnetic head 104 will now be described. Starting at the bottom, in direct contact with a substrate 200 is an undercoat layer 210, which is typically made of $Al_2O_3$. Above layer 212 are layers 214 and 216 which together form the bottom pole P1 of magnetic head 204. A coil C1 is formed in an opening in layer 216, separated from layer 214 by an insulating layer 218. Layer 220 forms top pole P2. Layer 222, normally referred to as the yoke, is formed of a magnetic material such as NiFe. It is important that the yoke layer 222 be in magnetic contact with layer 220. Layer 222 is curved, and a coil C2 is formed in the space created by the curve in layer 222. Poles P1 and P2 are separated by an insulating layer 224 which becomes gap layer 226 at the air-bearing surface ABS. To write data, a current is applied through terminals (not shown) that connect to coils C1 and C2. This current induces a magnetic field across gap layer 226, which writes data onto a magnetic data storage disk.

An overcoat layer 206 covering yoke layer 222 is typically made of $Al_2O_3$.

Methods of fabricating bottom pole P1 and coils C1 and C2 and the intervening insulating layers are well known in the art and will not be described here.

FIGS. 4A and 4B illustrate two steps of a current process for forming top pole P2. As described in greater detail below, top pole P2 is normally formed by plating a layer of a magnetic material (e.g., NiFe, CoFe or CoNiFe) on top of gap layer 226, which is normally made of $Al_2O_3$. Initially, a seed layer is formed on top of gap layer 226. The shape of top pole P2 is defined by a trench that is formed in a photoresist layer (not shown in FIGS. 4A and 4B) before the plating process begins.

The magnetic layer that forms top pole P2 is plated and then ion milled to a thickness of about 2.3 µm, as shown in FIG. 4A. Then a layer of $Al_2O_3$ is deposited to a thickness of about 4.2 µm. The final thickness or height of top pole P2 (represented by the vertical dimension in FIGS. 4A and 4B.) is about 1.5 µm. To achieve this thickness, a chemical-mechanical polishing (CMP) process is used to remove a sufficient amount of the $Al_2O_3$ layer and top pole P2 until the structure shown in FIG. 4B is obtained. In addition to providing the desired thickness of top pole P2, this process assures that all top poles P2 in the wafer will be opened so that the connection to yoke layer 222 can be made, as described above.

There are several problems with this process. First, an extra thickness of approximately 0.8 µm of top pole P2 and approximately 2.7 µm of $Al_2O_3$ must be deposited and removed by CMP, consuming material and valuable processing time. Second, as described below, the photoresist layer that is used to define the shape of top pole P2 must be thicker to form a top pole P2 with an initial thickness of 3.8 µm. Correspondingly, the aspect ratio (depth divided by width) of the trench that is used to form the top pole P2 must be greater. This in turn makes it more difficult to form a trench with straight walls and predictable critical dimension (CD), particularly as shorter wavelength radiation is used to expose and pattern the photoresist layer. Generally, as the CD decreases in heads that are used to read and write densely packed data, the industry is transitioning from I-line photolithography (λ=365 nm) to deep ultraviolet (DUV) photolithography (λ=248 nm) to form the trench that is used to define the top pole P2. DUV photolithography provides better definition and hence control of the CD than I-line photolithography, but DUV radiation has a smaller depth of focus than I-line radiation. This makes it more difficult to work with a relatively thick photoresist layer.

Moreover, as shown in FIG. 5A, the opening of a trench formed with DUV photolithography has a characteristic "flare," which produces a top pole 50 of the kind shown in FIG. 5B. As those skilled in the art will understand, top pole 50 casts a "shadow" that increases the difficulty of subsequently removing material by isotropic processes such as ion milling. Furthermore, the "flare" increases the difficulty of controlling the profile of the walls of the top pole itself during subsequent ion milling processes. Therefore, to ensure that top pole P2 is formed in the "straight" portion of the trench, the photoresist layer used with DUV photolithography needs to be at least 2 μm deeper than the thickness of the as-plated top pole P2. This in turn significantly degrades the resolution of the DUV photolithography and the control of the profile of the top pole P2.

Finally, the CMP process that is used to define the thickness of the top pole P2 is inherently difficult to control, and this leads to variation (defined as sigma) in the thickness of the top poles P2 within a given wafer (WIW) and from wafer to wafer (WTW).

Accordingly, there is a need for a process that avoids these problems in the formation of the top pole P2 using DUV photolithography.

SUMMARY

In accordance with this invention, a CMP stop layer comprising rhodium (Rh) is formed over the $Al_2O_3$ layer, and a slurry comprising silicon dioxide ($SiO_2$), ammonium persulfate (APS) and benzotriazole (BTA) is employed in the CMP process that removes the portion of the $Al_2O_3$ layer covering the top pole P2. This $SiO_2$/APS/BTA slurry exhibits a strong preference (approximately 1000:1) for removing $Al_2O_3$ in comparison to Rh. Thus, the CMP process can be performed until the top pole P2 is exposed with the CMP stop layer essentially intact. The thickness of the top pole P2 and $Al_2O_3$ layers as deposited can be approximately equal to the target thickness of the top pole P2. The need to deposit and remove an extra thickness of the top pole and $Al_2O_3$ layers is eliminated, saving both material and processing time. Because the top pole P2 layer is plated to approximately the target thickness of the top pole P2, the thickness of the photoresist layer that is used to define the shape of the top pole P2 can be reduced, minimizing the depth-of-focus problems in using DUV radiation to define the trench in the photoresist layer.

BRIEF DESCRIPTION OF THE DRAWINGS

This invention will be better understood by reference to the following drawings, which are generally not drawn to scale.

DETAILED DESCRIPTION

A process according to this invention avoids the need to remove a large portion of a thick $Al_2O_3$ refill layer and P2 pole material by chemical-mechanical polishing (CMP). Hence, there is no need to deposit an extra thick $Al_2O_3$ layer and P2 pole layer. Instead, the $Al_2O_3$ layer is deposited to its final thickness, and a CMP stop layer is deposited on top of the $Al_2O_3$ layer.

Figure 1:
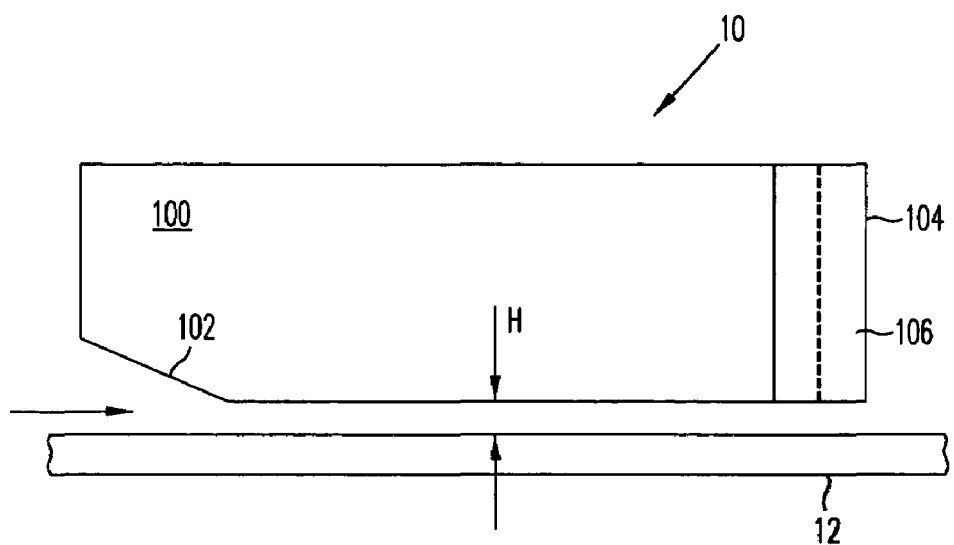
FIG. 1 is a side view of a slider containing a thin film magnetic recording head and a magnetic data storage disk over which the slider is flying.
Figure 2:
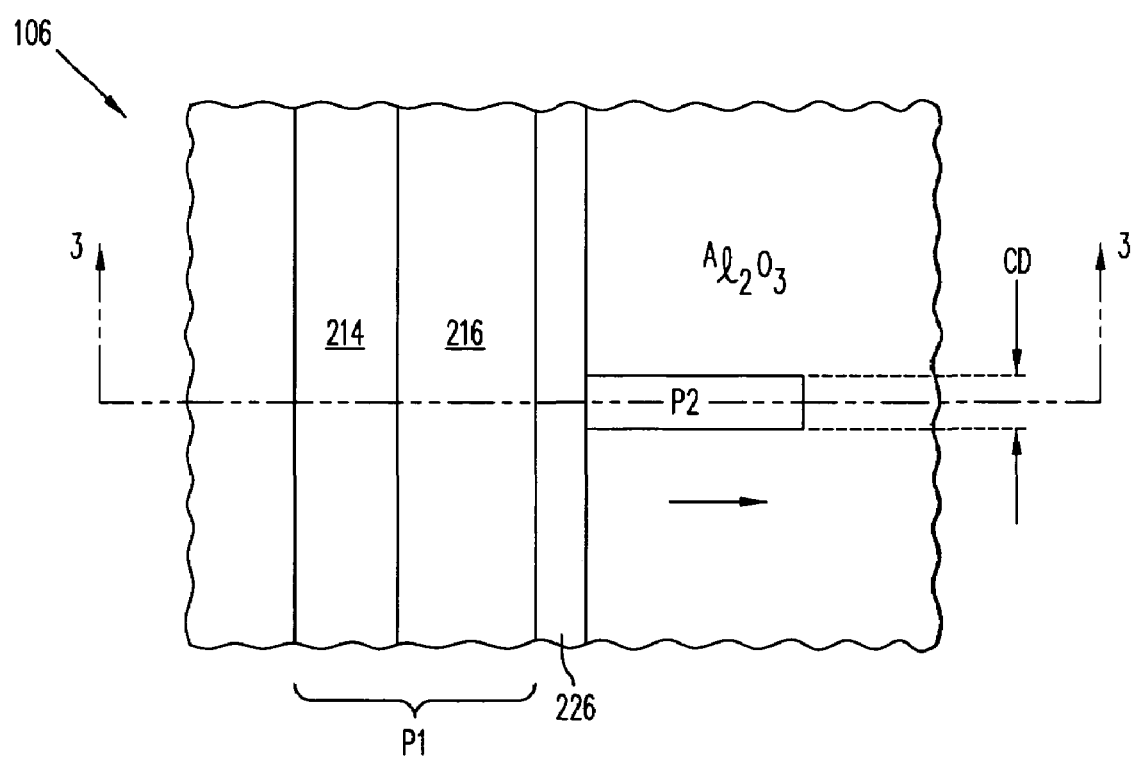
FIG. 2 is a plan view of a portion of the air-bearing surface (ABS) of the magnetic head writer, including the top and bottom write poles.
Figure 3:
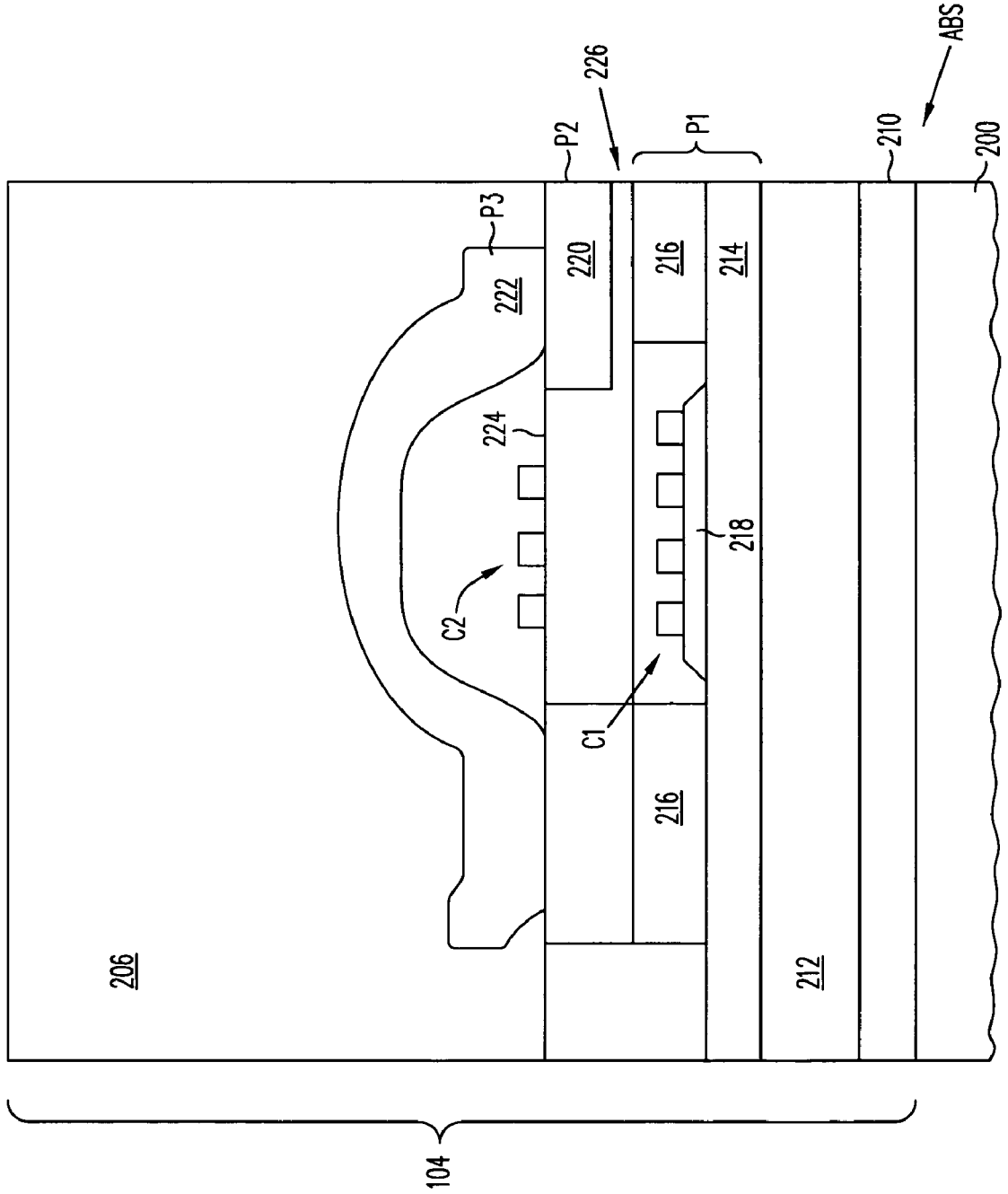
FIG. 3 is a cross-sectional view of the magnetic head writer taken at section 3—3 shown in FIG. 2.
Figure 4A:
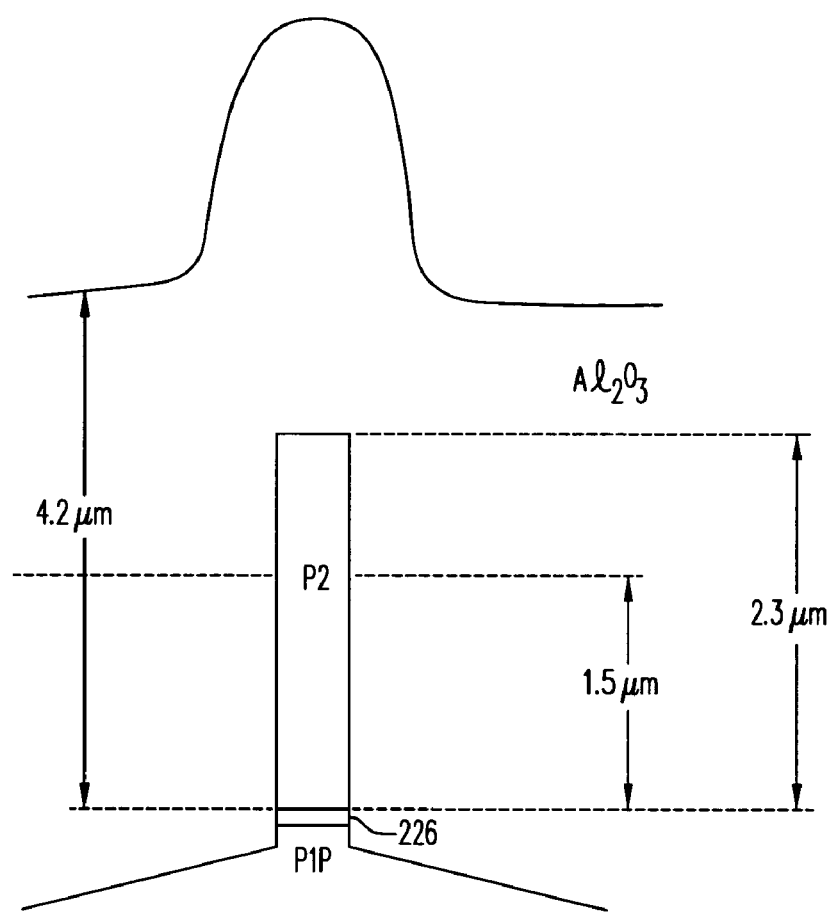
FIGS. 4A and 4B illustrate two stages of a current process of forming the top pole.
Figure 4B:
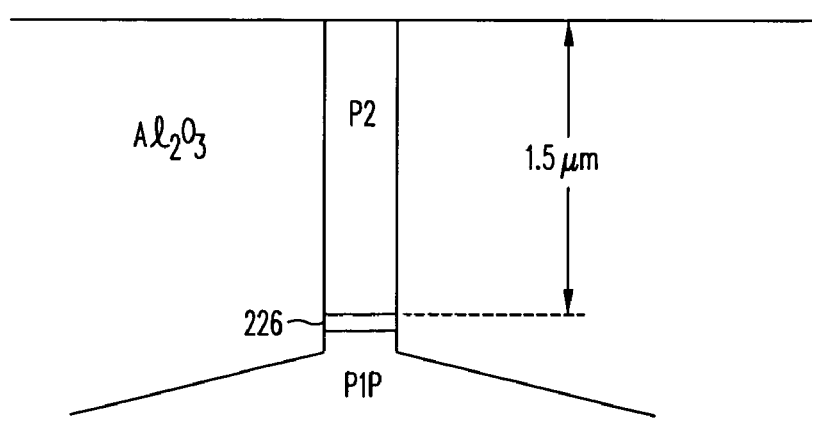
Figure 5A:
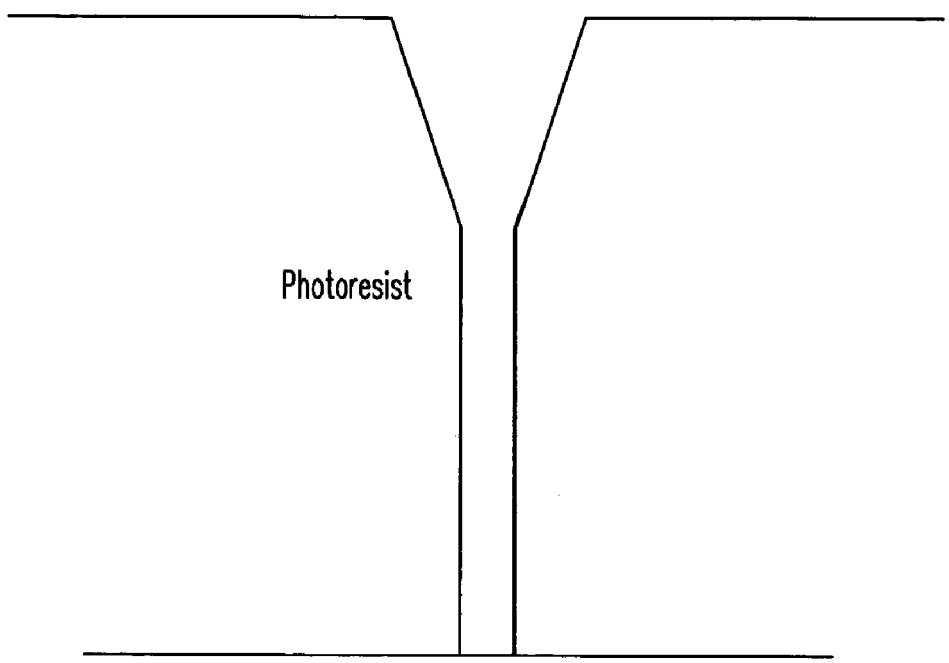
FIG. 5A is a view of a trench formed in a photoresist layer using deep ultraviolet (DUV) radiation.
Figure 5B:
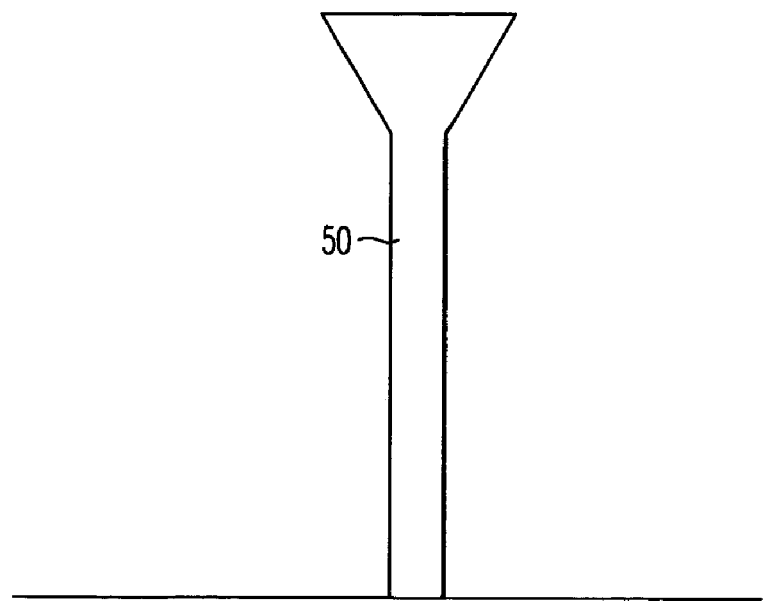
FIG. 5B is a side view of a top pole formed in the trench shown in FIG. 5A.
Figure 6:
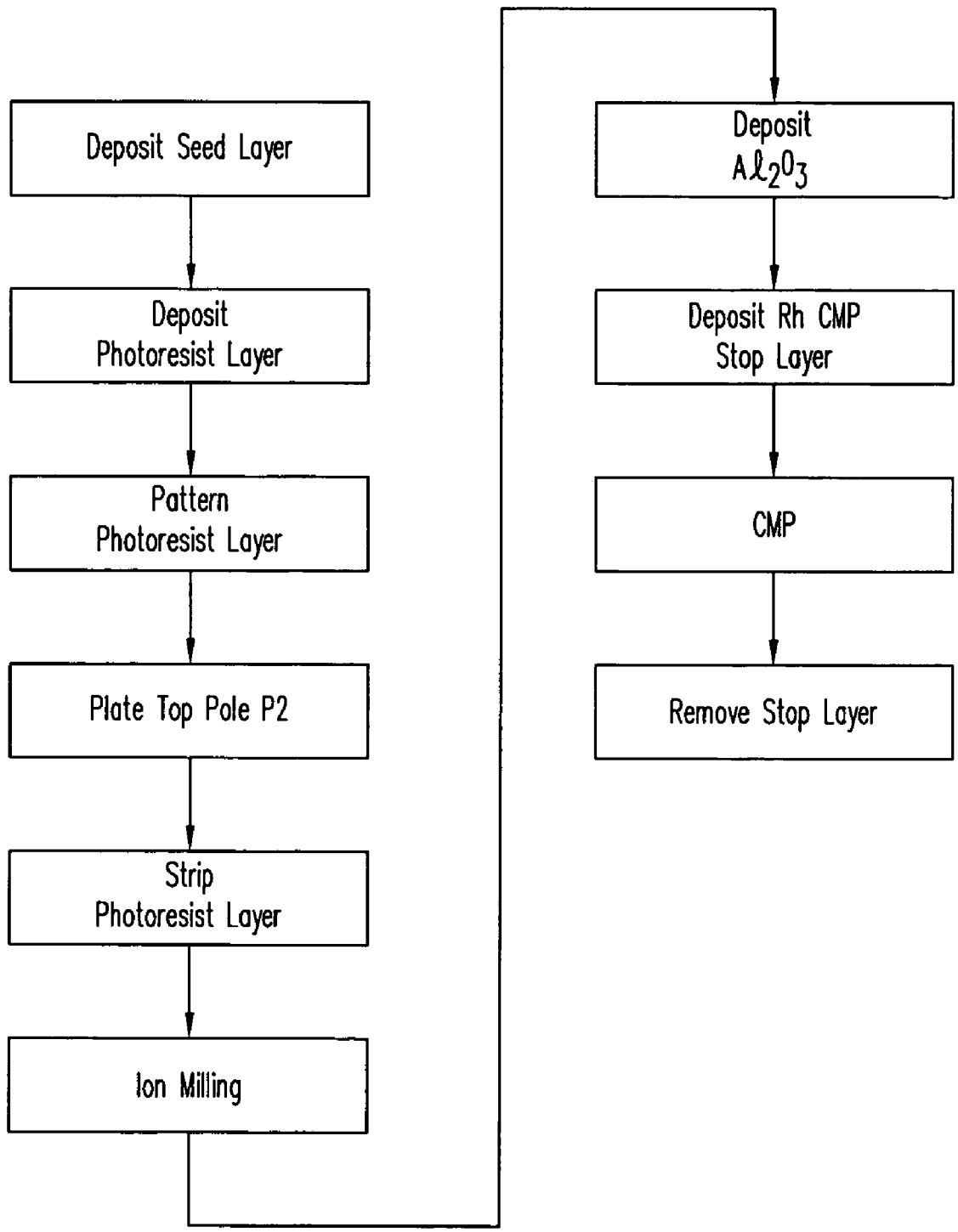
FIG. 6 is a flow diagram of a process in accordance with this invention.

The process is summarized in the flow diagram of FIG. 6 and illustrated in FIGS. 7A–7I.

Figure 7A:
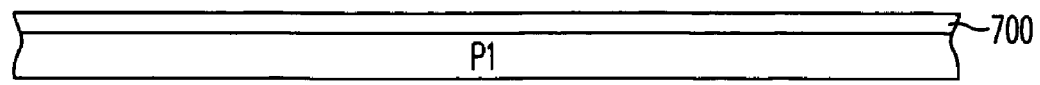
FIGS. 7A–7I illustrates a process sequence in accordance with this invention.

Referring first to FIG. 7A, the process begins after a gap layer 700, typically made of $Al_2O_3$, has been formed on top of the bottom pole P1. Bottom pole P1 and the underlying structure in the magnetic head can be formed in a variety of ways and are not in any way limited by this invention. A plating seed layer (not shown) is formed on top of gap layer 700. The composition of the seed layer depends on the composition of top pole P2. Assuming that the top pole P2 is to be formed of NiFe, CoNiFe, or CoFe, the seed layer could be made of NiFe, CoFe, CoFeNi, CoFeN, or CoFeB and could be 160 nm thick, for example. The seed layer can be deposited by sputtering.

Figure 7B:
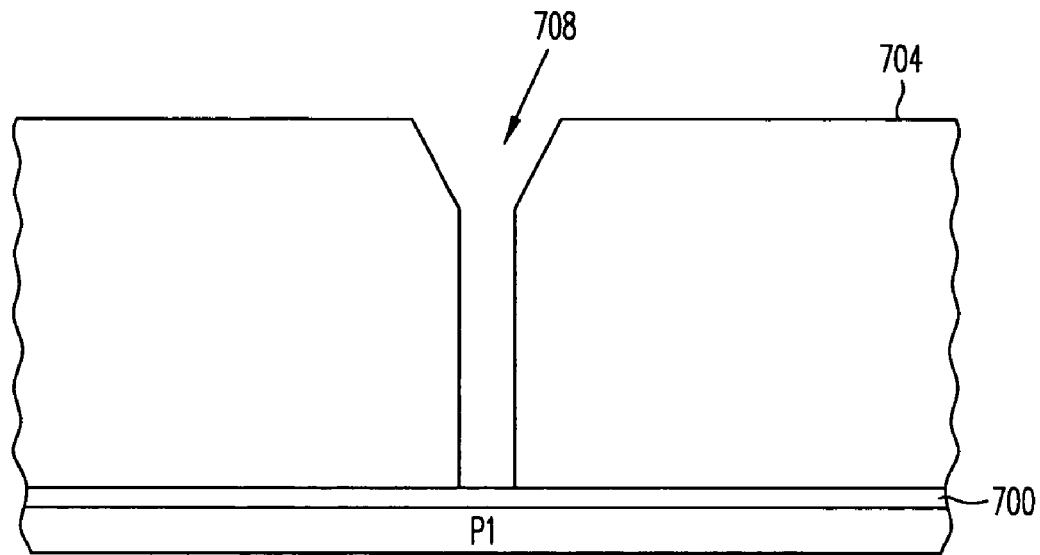

As shown in FIG. 7B, a photoresist layer 704 is deposited on top of the seed layer, and a trench 708 is formed in photoresist layer 704 by a photolithographic process, preferably using deep ultraviolet (DUV) radiation. FIG. 7B shows the characteristic "flare" that will be formed at the opening of trench 708 if trench 708 is formed using DUV radiation. In this embodiment photoresist layer 704 is 4.8 μm thick. The "flare" accounts for approximately 1.8 μm of this thickness, leaving approximately 3.0 μm of trench 708 with relatively straight walls. The width of trench 708 defines the critical dimension of the top pole (e.g., 0.2 μm).

Figure 7C:
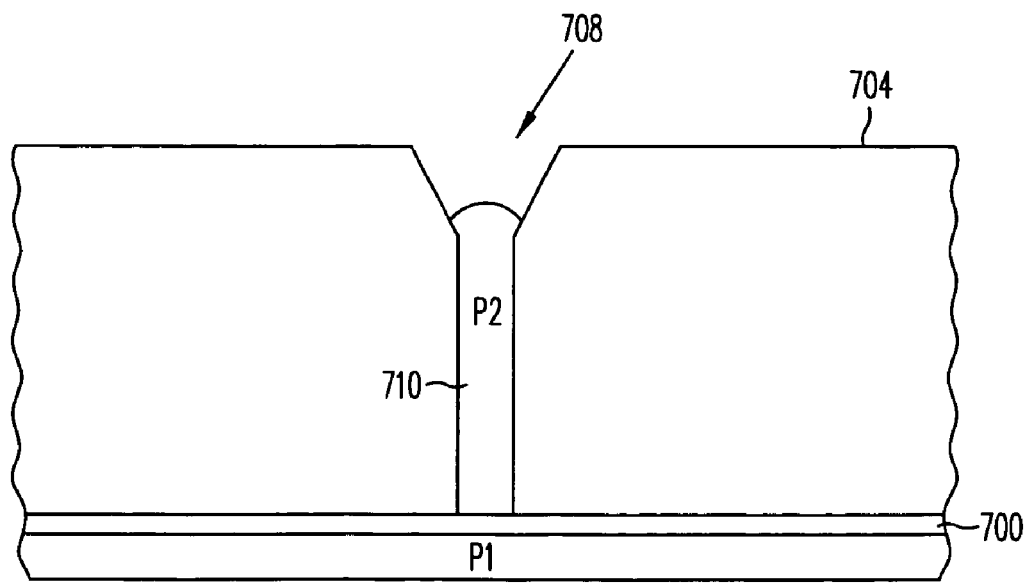

As shown in FIG. 7C, a top pole 710 is formed in trench 708 by plating. The top surface of pole 710 just extends just above the level at which the flare in trench 708 begins. Typically, the post ion mill thickness of pole 710 (the vertical dimension in FIG. 7C) is slightly greater than the target thickness of pole 710 (e.g., 1.5 μm).

Figure 7D:
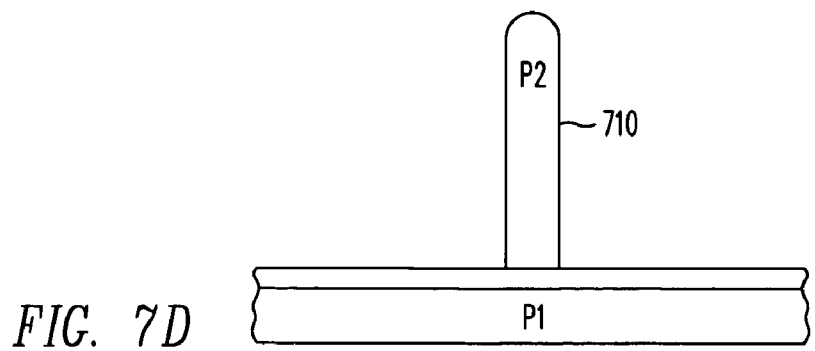

As shown in FIG. 7D, photoresist layer 704 is removed, leaving top pole 710 resting on gap layer 700.

Figure 7E:
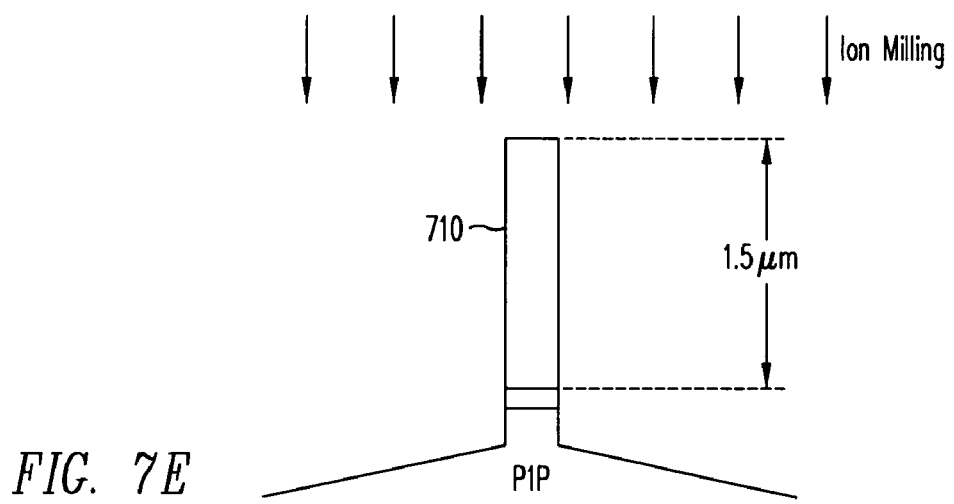

As shown in FIG. 7E, an ion milling process is performed on top pole 710 to reduce the thickness of top pole 710 to the target thickness of the finished pole (e.g., 1.5 μm). This process also removes the portions of gap layer 700 that are not covered by top pole 710 as well as a portion of bottom pole P1, leaving a pedestal portion P1P of bottom pole P1.

Figure 7F:
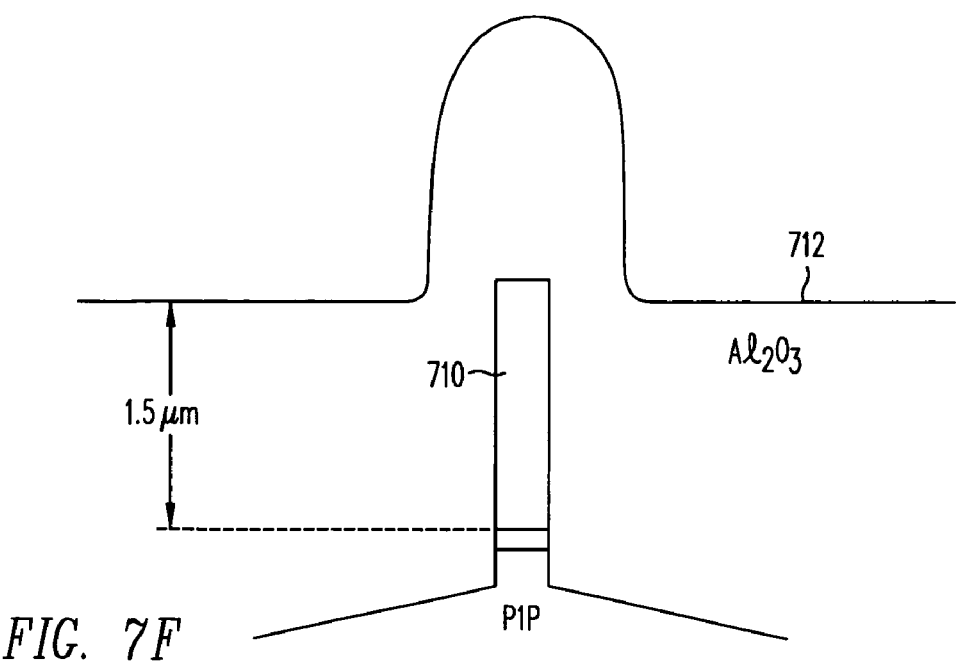

As shown in FIG. 7F, an $Al_2O_3$ layer 712 is deposited by sputtering or PVD (physical vapor deposition) forming a "hill" over top pole 710 and a flat portion on both sides of the "hill." The deposition process continues until the flat portion of the top surface of $Al_2O_3$ layer 712 is approximately coplanar with the top surface of top pole P2.

Figure 7G:
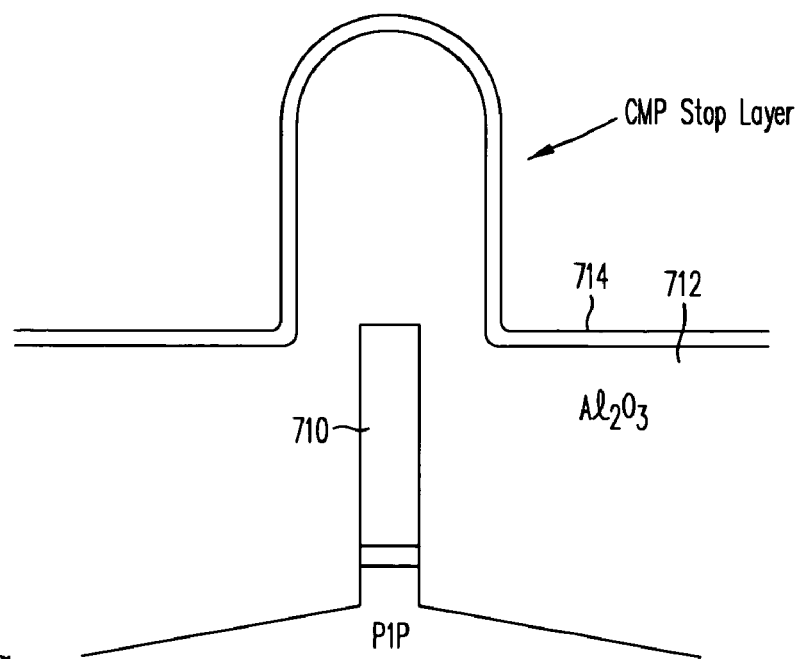

As shown in FIG. 7G, a CMP stop layer 714 is deposited by sputtering on top of Al$_2$O$_3$ layer 712. In this embodiment, CMP stop layer 714 includes a layer of Rh which is 900 Å thick overlying an adhesion layer of Ta which is 100 Å thick. This process is performed in a conventional sputtering tool with a target of Ta and then a target of Rh. Ta and Rh targets are available commercially.

Next, the structure is subjected to a CMP process using a slurry that exhibits a strong preference for removing Al$_2$O$_3$ in comparison to Rh. In this embodiment, a slurry containing silica (SiO$_2$), ammonium persulfate (APS) and benzotriazole (BTA) is used. The proportions of these ingredients could be in the following ranges: SiO$_2$—1% to 30%; APS—0.01% to 2%; and BTA—0.0001% to 0.1%, the balance being de-ionized (DI) water. The pH could be from 8 to 12.

Figure 7H:
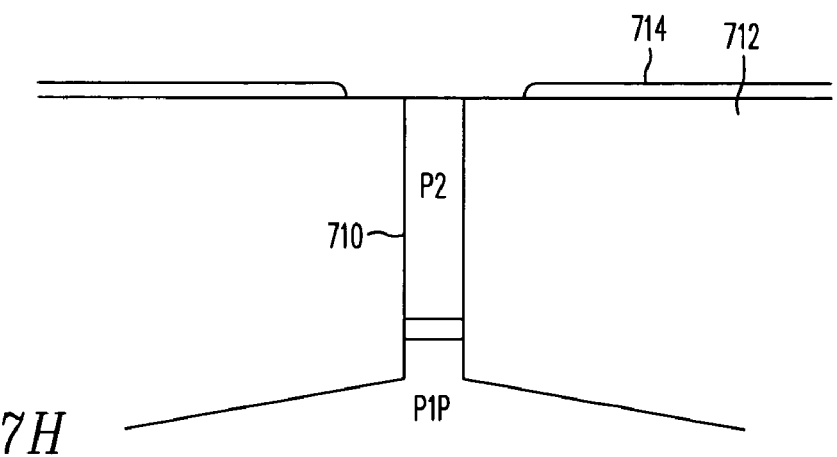

In one embodiment, the slurry includes 10% SiO$_2$, 0.2% APS and 0.002% BTA, and the pH is 10. That slurry has a 1000:1 material removal selectivity for Al$_2$O$_3$ in comparison to Rh. The polishing force can be 1–6 psi, for example, 3 psi. The result of the CMP process is shown in FIG. 7H. Note that the CMP process wears away the portion of CMP stop layer 714 on the "hill."

Figure 7I:
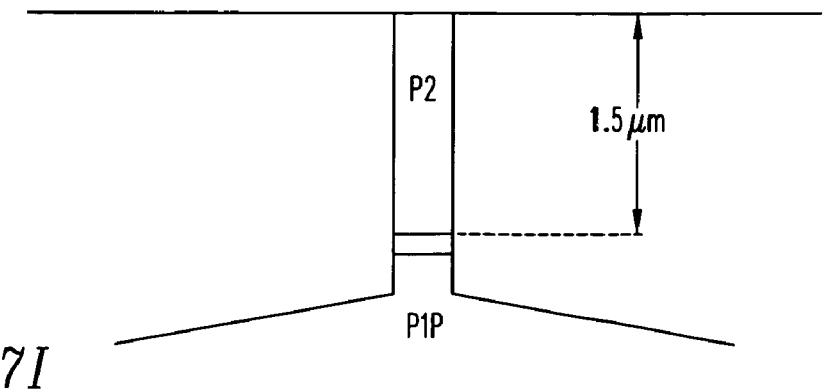

Next, as shown in FIG. 7I, CMP stop layer 714 is removed by ion milling. While not shown in FIGS. 7H and 7I, the top surface of top pole 710 is recessed with respect to the surrounding surface by approximately 0.15 μm following the CMP process and approximately 0.1 μm following the removal of CMP stop layer 714. This indicates that the SiO$_2$/APS/BTA slurry balances the chemical-mechanical action very well for this application. In other words, after the removal CMP stop layer 714, the top surface of the Al$_2$O$_3$ layer 712 and the top surface of the top magnetic pole 710 are approximately coplanar.

With the top surface of top pole 710 exposed, the yoke layer P3 222 can be deposited on top of top pole 710, and the remainder of the head can be fabricated in a variety of ways.

The process of this invention achieves numerous benefits. It avoids the need to plate and remove approximately 0.8 μm of the top pole and the need to deposit and remove approximately 2.7 μm of the Al$_2$O$_3$ layer. This saves 25% of the plating time and 60% of the Al$_2$O$_3$ deposition time. In addition, because the Al$_2$O$_3$ deposition process is more controllable than the CMP Al$_2$O$_3$ removal process, the variability of the results is far less than those obtained using the prior art process.

These results are exemplified in Tables 1 and 2. Each table shows the thickness plated, deposited or removed at a stage of the process and the variability (1 sigma) of the results within a given wafer. Table 1 shows the results for processes in accordance with the invention. Table 2 shows the results for a prior art process.

TABLE 1

| Process Step | Thickness (nm) | Variability (1 sigma) |
| --- | --- | --- |
| Plated pole layer | 2930 | 60 |
| Ion milling | 1600 | 60 |
| Al$_2$O$_3$ layer | 1564 | 8.3 |
| Plated pole layer after CMP and removal of stop layer | 1518 | 8.3 |

TABLE 2

| Process Step | Thickness (nm) | Variability (1 sigma) |
| --- | --- | --- |
| Plated pole layer | 3800 | |
| Ion milling | 2260 | |
| Al$_2$O$_3$ layer | 4200 | |
| Plated pole layer after CMP and removal of stop layer | 1480 | 85 |

Note that the variability (sigma) of the final thickness of the plated pole layer decreased by a factor of approximately 10 in the processes of the invention (Table 1) as compared with the prior art process (Table 2).

Although the present invention is illustrated in connection with specific embodiments for instructional purposes, the present invention is not limited thereto. For example, while the embodiment described above relates to the formation of the top pole in a magnetic head, the process of this invention may be used in forming the bottom pole of a magnetic head, the top or bottom pole of other types of heads, or a variety of structures in devices other than reading and writing heads. Various adaptations and modifications may be made without departing from the scope of the invention. Therefore, the spirit and scope of the appended claims should not be limited to the foregoing description.

What is claimed is:

1. A process of fabricating a pole in a magnetic read-write head comprising:
   forming a first layer of a non-magnetic material;
   forming a mask layer over the first layer;
   forming a trench in the mask layer;
   forming a second layer of a magnetic material over the first layer in the trench;
   removing the mask layer, leaving the second layer in place;
   forming a third layer of a non-magnetic material over the first and second layers;
   forming a CMP stop layer over the third layer, the CMP stop layer comprising Rh; and
   performing a CMP process to remove a portion of the third layer thereby exposing a surface of the second layer.

2. The process of claim 1 wherein performing a CMP process comprises using a slurry that has a preference for removing the third layer as compared with removing the CMP stop layer.

3. The process of claim 2 wherein the slurry comprises at least one material selected from the group consisting of SiO$_2$, APS and BTA.

4. The process of claim 3 wherein the slurry comprises SiO$_2$, APS and BTA.

5. The process of claim 1 wherein forming a CMP stop layer comprises forming a Ta layer and forming a Rh layer on top of the Ta layer.

6. The process of claim 5 wherein the Ta layer is 100 Å thick and the Rh layer is 900 Å thick.

7. The process of claim 1 wherein performing a CMP process comprises using a force of approximately 3 psi.

8. The process of claim 1 wherein forming a second layer comprises plating.

9. The process of claim 8 wherein forming a second layer comprises plating a layer of a material selecting from the group consisting of NiFe, CoFe and CoNiFe.

10. The process of claim 9 comprising forming a seed layer on top of the first layer.

11. The process of claim 10 wherein the seed layer comprises a material selected from the group consisting of NiFe, CoFe, CoFeNi, CoFeN, and CoFeB.

12. The process of claim 9 wherein forming a second layer comprises plating NiFe.

13. The process of claim 1 wherein forming a mask layer comprises forming a photoresist layer.

14. The process of claim 13 wherein forming a trench comprises exposing the photoresist layer to DUV radiation.

15. The process of claim 1 comprising removing the CMP stop layer.

16. The process of claim 1 comprising ion milling the second layer after removing the mask layer and before forming a third layer.

17. A process of forming a magnetic read-write head comprising:
    forming a bottom write pole;
    forming an $Al_2O_2$ magnetic gap layer over the bottom write pole;
    forming a seed layer over the $Al_2O_2$ magnetic gap layer;
    forming a photoresist layer over the seed layer;
    exposing the photoresist layer using DUV radiation;
    forming a trench in the photoresist layer thereby exposing a portion of the seed layer;
    plating a top write pole on the seed layer in the trench;
    removing the photoresist layer;
    ion milling the top write pole;
    forming a second $Al_2O_2$ layer over the top write pole and the seed layer;
    forming a CMP stop layer over the second $Al_2O_2$ layer, the CMP stop layer comprising Rh;
    performing a CMP process to remove a portion of the second $Al_2O_2$ layer and a portion of the CMP stop layer, the CMP process using a slurry comprising $SiO_2$, APS and BTA;
    removing a remaining portion of the CMP stop layer; and
    forming a yoke layer in contact with the top write pole.

18. An intermediate read-write head comprising:
    a bottom magnetic pole;
    an $Al_2O_3$ magnetic gap layer over the bottom magnetic pole;
    a top magnetic pole over the $Al_2O_3$ magnetic gap layer;
    a second $Al_2O_3$ layer over the top and bottom magnetic poles; and
    a CMP stop layer over the second $Al_2O_3$ layer, the CMP stop layer comprising Rh.

19. The intermediate read-write head of claim 18 wherein the CMP stop layer comprises a Rh layer overlying a Ta layer.

20. An intermediate read-write head comprising:
    a bottom magnetic pole;
    an $Al_2O_3$ magnetic gap layer over the bottom magnetic pole;
    a top magnetic pole over the $Al_2O_3$ magnetic gap layer;
    a second $Al_2O_3$ layer over the bottom magnetic pole, a top surface of the second $Al_2O_3$ layer and a top surface of the top magnetic pole being approximately coplanar; and
    a CMP stop layer over the second $Al_2O_3$ layer, the CMP stop layer comprising Rh.

21. The intermediate read-write head of claim 20 wherein the CMP stop layer comprises a Rh layer overlying a Ta layer.

* * * * *

UNITED STATES PATENT AND TRADEMARK OFFICE
CERTIFICATE OF CORRECTION

| | |
|---|---|
| PATENT NO. | : 7,029,376 B1 |
| APPLICATION NO. | : 11/255907 |
| DATED | : April 18, 2006 |
| INVENTOR(S) | : Guthrie et al. |

It is certified that error appears in the above-identified patent and that said Letters Patent is hereby corrected as shown below:

Claim 17
Col. 7, Line 4: Delete "$Al_2O_2$" and substitute --$Al_2O_3$--.
Col. 7, Line 6: Delete "$Al_2O_2$" and substitute --$Al_2O_3$--.
Col. 7, Line 14: Delete "$Al_2O_2$" and substitute --$Al_2O_3$--.
Col. 7, Line 16: Delete "$Al_2O_2$" and substitute --$Al_2O_3$--.
Col. 8, Line 19: Delete "$Al_2O_2$" nd substitute --$Al_2O_3$--.

Signed and Sealed this

Twenty-fifth Day of July, 2006

JON W. DUDAS
*Director of the United States Patent and Trademark Office*